Sept. 28, 1971 J. D. BISSELL 3,608,207
TEACHING APPARATUS
Filed July 8, 1969 3 Sheets-Sheet 1

INVENTOR
JAMES D. BISSELL

BY
Cushman, Darby & Cushman
ATTORNEYS

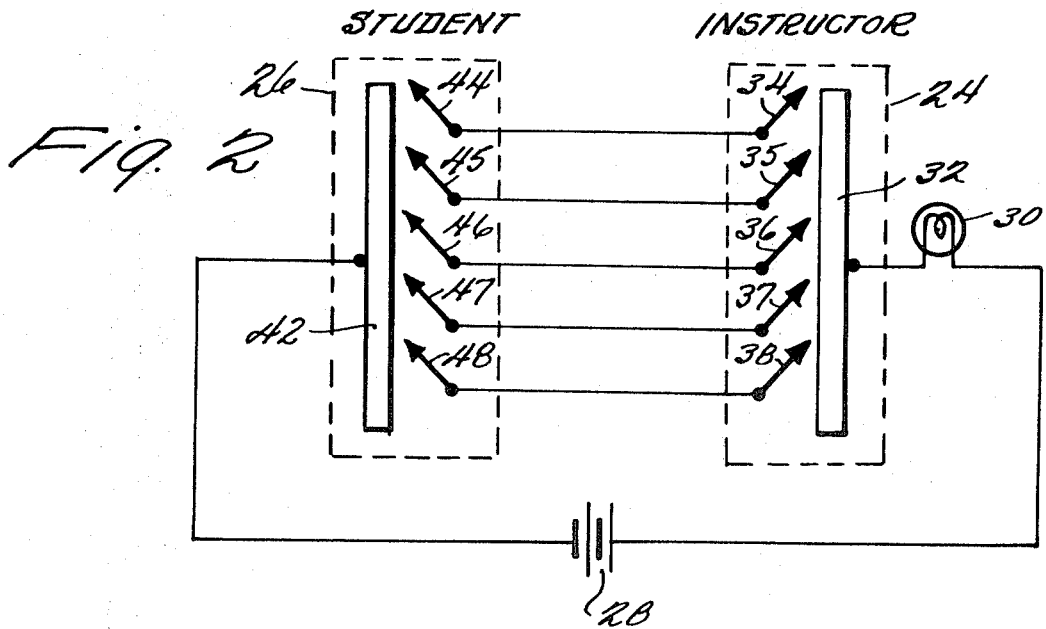
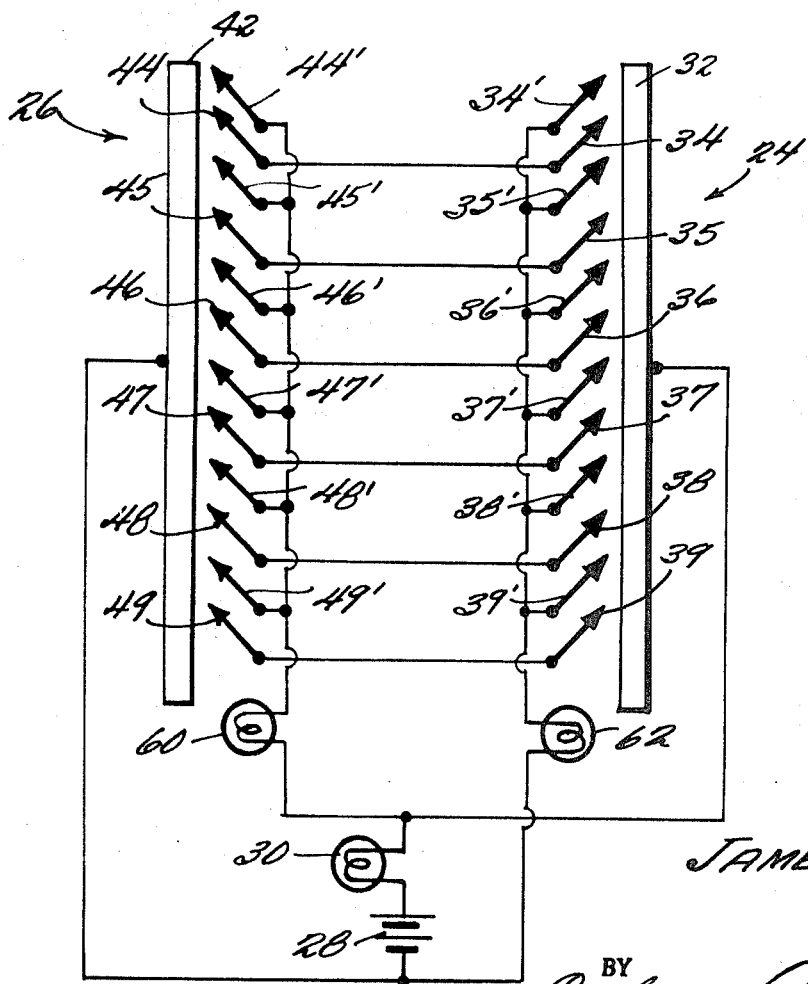

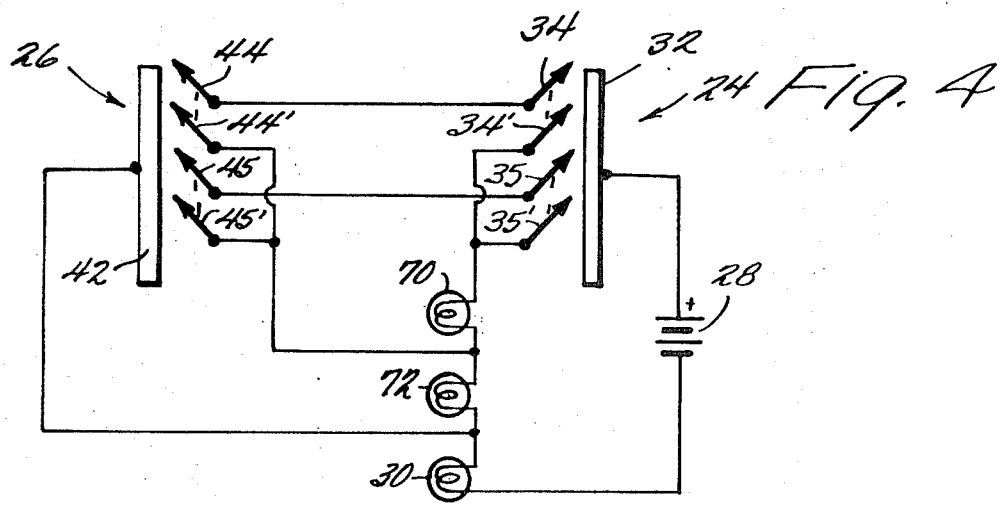
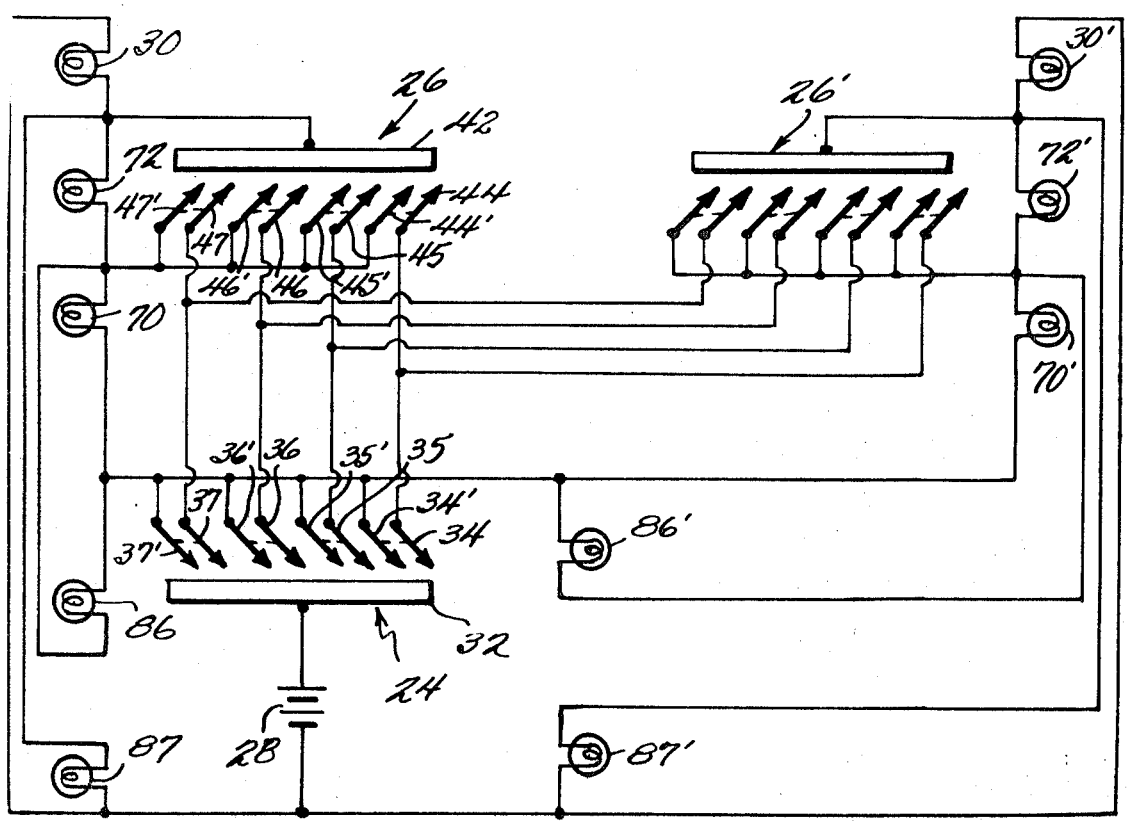

United States Patent Office 3,608,207
Patented Sept. 28, 1971

3,608,207
TEACHING APPARATUS
James D. Bissell, Rte. 1, Pfafftown, N.C. 27040
Filed July 8, 1969, Ser. No. 839,867
Int. Cl. G09b 7/02
U.S. Cl. 35—9R
13 Claims

ABSTRACT OF THE DISCLOSURE

Teaching apparatus for taking advantage of the psychological factor of reward in teaching so as to make the learning process a pleasant game playing experience wherein the apparatus includes an instructor's position and one or more student positions. The instructor's position and each of the student positions are provided with a plurality of buttons over which identical overlays may be placed wherein the overlays contain a plurality of colors, shapes, numbers, letters, words etc. which represent answers to questions. The apparatus is provided with ready-right/wrong circuitry so that the instructor initially asks the students a question and presses the appropriate button on his panel to indicate the correct answer. When this occurs the ready light is lighted at each of the student positions and the students then press the button which they believe corresponds to the correct answer to the question. If the correct button is pushed the "right" light will be lighted at the student console and if the wrong answer is selected the wrong light will be lighted.

---

The present invention relates to teaching apparatus and more particularly to teaching apparatus designed to make the learning process as pleasant as possible and wherein the apparatus is designed with a ready-right/wrong feature to prevent student cheating.

Those concerned with the development of teaching devices have long recognized the need for a simple teaching device which can be made economically and which has mass application in the teaching field. Many teaching devices are presently on the market which indicate right and wrong answers by students and other teaching devices provide for an indicator to show the student that the teacher is ready for the student to answer the question. However, these devices are often bulky in physical size and expensive to produce since they are relatively complex and require a large number of elements.

Accordingly, the general purpose of this invention is to provide teaching apparatus which embraces all the advantages of similarly employed teaching devices and possesses none of the aforedescribed disadvantages. To attain this the present invention contemplates a unique shunt arrangement for the ready-right/wrong indicator lights whereby the student are informed when they may answer the question and whereby the correctness of the students answers is indicated to the students, teachers or both by means of relatively simple and maintenance free circuitry.

An object of the present invention is the provision of a teaching device which can be made economically.

Another object is to provide teaching apparatus with mass application in the teaching field.

A further object of the invention is the provision of teaching apparatus which provides a visual reward for a correct answer so as to encourage the learning process.

Still another object is to provide teaching apparatus of simple design and construction.

Yet another object of the present invention is the provision of teaching apparatus which includes a ready-right/wrong feature to prevent student cheating.

Other objects and features of the invention will become apparent to those of ordinary skill in the art as the disclosure is made in the following description of a preferred embodiment of the invention as illustrated in the accompanying drawings in which:

FIG. 2 is a schematic illustration of the circuit in the basic device illustrated in FIG. 1;

FIG. 3 is a schematic view of the basic embodiment including an anti-cheat circuit to prevent student cheating;

FIG. 4 is a schematic view of the invention including the ready-right/wrong feature;

FIG. 6 is a schematic illustration of the multi-student apparatus incorporating the ready-right/wrong feature.

Figure 1:
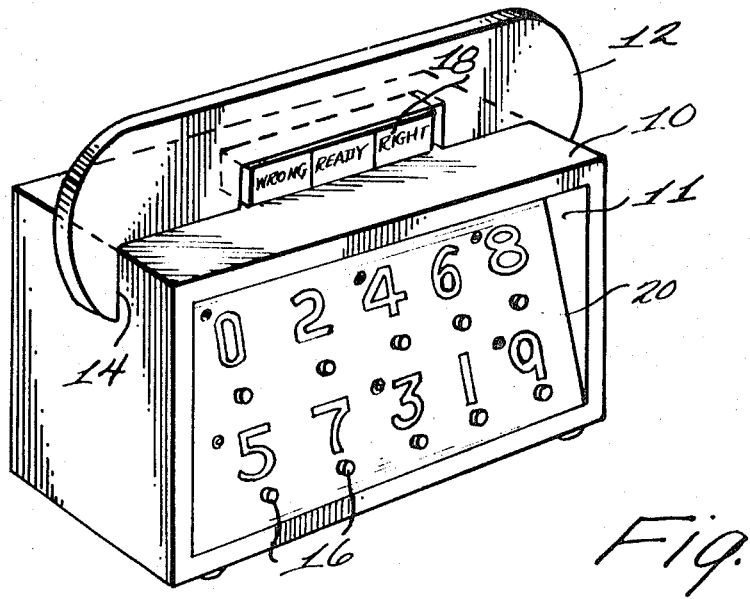
FIG. 1 is a perspective view of the basic teaching device of the invention.

With reference now to the drawings, wherein like reference characters designate like or corresponding parts throughout the several views, there is shown in FIG. 1 the basic teaching device of this invention which includes a cabinet 10 and a blind 12 which may be placed in slots 14 located at the top and on either side of the cabinet 10 so as to prevent the student from seeing which of the buttons 16 the instructor is depressing to indicate the answer to the question asked of the student. In the basic device a single light may be located in the top of the cabinet 10 and within a translucent cover 18. This light will be illuminated only when the student depresses the button which corresponds to the correct answer to the question asked by the instructor. In the other embodiments of the invention two additional lights may also be located within the translucent cover 18. One of these lights may be termed the "ready" light and will be illuminated when the instructor has pressed the button on his side of the device corresponding to the correct answer to this question. The other light on the top of the cabinet 10 is the "wrong" light which will be illuminated if the student depresses the button on his side of the device which corresponds to an incorrect answer to the question asked by the instructor.

The panel 20 and the corresponding panel (not shown) on the other side of the device receive any one of a number of overlays (not shown) which may be placed on the panel 20 so that a variety of questions and answers may be utilized with the device. The overlays are held in position on the panels by grooves, e.g. ¼ inch deep (not shown), cut into the side panels 11 of the cabinet 10 since the overlays are about ½ inch longer than the exposed section of the panels. For example, overlays corresponding to shapes, colors, numbers, letters, words, animals, insects, coins, tools, plants, trees, famous people, ships, aircraft, etc. may be fitted into place on the panels with identical overlays being placed on the instructor's side and on the student's side of the device. The instructor then asks a question and at an appropriate time depresses the button 16 which is associated with the correct answer to the question. If the basic device is being used no light is illuminated at this point. However, if the ready-right/ wrong embodiment is utilized the "ready" light will be illuminated to indicate to the student that he may now depress his button to indicate his choice of an answer. The student then depresses his button indicating his choice of an answer and if the answer is correct the light indicating that the answer is correct is illuminated and conversely if the answer chosen is incorrect the "wrong" light is illuminated.

The basic circuit of the device is illustrated in FIG. 2 and includes a first instructor's switching means 24 and a second student switching means 26. Each of these switching means is connected in circuit with each other and they are coupled with an electrical source 28 and an indicator means or "right" light 30 for indicating a correct student answer.

Figure 5:
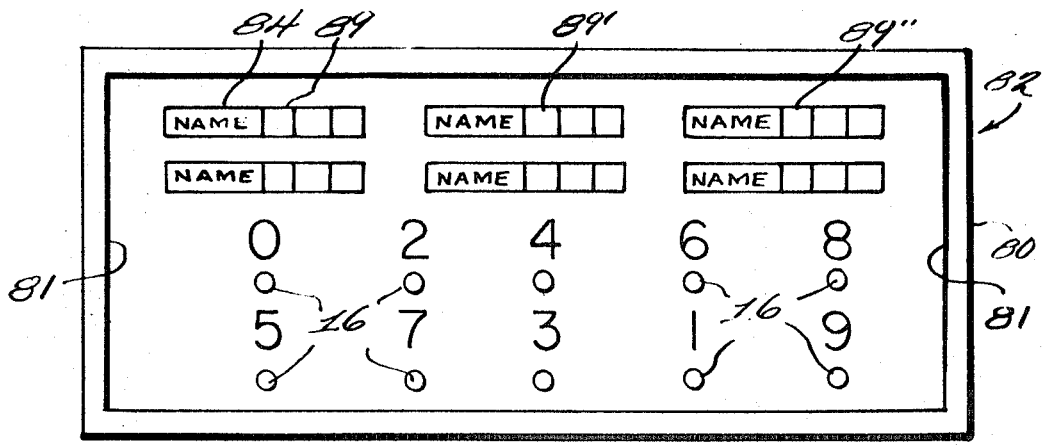
FIG. 5 is a front elevation view of the instructor's console of the present invention in a multi-student apparatus.

The first instructor switching means 24 includes a primary terminal 32 which is directly coupled to the indicator light 30 and a plurality of secondary contacts 34–38 each of which is operatively associated with a respective one of the push buttons 16 so that upon depression of the appropriate button 16 one of the secondary contacts 34–38 is placed in electrical contact with the primary terminal 32. Of course, those in the art will readily appreciate that any number of secondary contacts may be employed, as for instance, ten are shown in FIG. 5.

Each of the secondary contacts 34–38 in the first instructor's switching means 24 is directly coupled to a respective one of the plurality of secondary contacts 44–48 in the second student switching means 26. The switching means 26 also includes a primary terminal 42 which is coupled to the source 28.

In the operation of this basic embodiment of the invention the instructor upon asking the question depresses the appropriate push button 16 which is associated with the answer to that question. If, for example, the appropriate secondary contact 34 were placed in contact with primary terminal 32 of the instructor's switching means 24 and if the student were to select the correct answer to the question by depressing his appropriate push button associated with secondary contact 44 a circuit would be completed from the source 28 through primary terminal 42, secondary contact 44, secondary contact 34, primary terminal 32, indicator light 30 and back to the source 28. Thus, if the student selects the correct answer he is rewarded by having the light 30 illuminated.

Conversely, if the student had selected a wrong answer and had depressed any one of the secondary contacts 45–48 no circuit would have been completed through the switching means 26 and 24 so that no current would have passed through the light 30 and it would have not been illuminated.

The circuit illustrated in FIG. 3 shows the basic teaching device with the anti-cheat feature included. In the basic device of FIG. 2 it is possible for the student to cheat by pressing all of the buttons one by one until the correct button is pressed and the light 30 is illuminated. Because there is no way for the instructor to determine when an incorrect answer has been selected it is possible for the student to cheat by depressing the buttons until the correct one is depressed and the light 30 is illuminated. This problem is overcome by the inclusion of the anti-cheat feature in the circuit of FIG. 3.

Again, the same basic instructor switching means 24 and student switching means 26 are utilized together with the source 28 and the correct answer indicating light 30. In addition, lights 60 and 62 are coupled between the switching means 26 and the light 30 and between the switching means 24 and the source 28, respectively. The switching means 24 also includes a first plurality of contacts 34'–39' each of which is operable with a respective one of the secondary contacts 34–39. Similarly, the student switching means 26 includes a second plurality of contacts 44'–49' each of which is operable with a respective one of the secondary contacts 44–49.

The first "ready" indicator light 62 and the second indicator light or the "wrong" light 60 have current ratings substantially ¼ that of the correct answer indicator light 30. As a result, when the instructor asks a question and selects the correct answer by depressing the appropriate one of the contacts 34–39 the related one of the first plurality of contacts 34'–39' is also depressed so that, for example, contacts 34 and 34' are both placed in electrical contact with the primary terminal 32 of the instructor's switching means 24. When this occurs current passes from the source 28 through the "ready" light 62, through contact 34', primary terminal 32, correct indicator light 30 and back to the source 28. Because the light 62 will fully light on substantially ¼ the current required to light the correct indicator light 30 only the "ready" light 62 will be illuminated and the correct light 30 will not be illuminated. This indicates to the student that the instructor has depressed the button on his panel corresponding to the correct answer to the question and informs the student that he may now depress the button on his panel which he believes to be associated with the correct answer.

If the student selects an incorrect answer by depressing, for example, contacts 46 and 46' current will then flow from the source 28 through primary terminal 42, contact 46', "wrong" light 60, correct answer indicator light 30 and back to the source 28. Again, because the light 60 will be illuminated on substantially ¼ the current required to illuminate light 30 the "wrong" light 60 will be illuminated but the correct answer indicator light 30 will not be illuminated. Thus, both the lights 60 and 62 will be illuminated but the light 30 will not be illuminated and this will indicate to both the instructor and the student that the student has selected the wrong answer. As a result the student can no longer press a series of buttons until he comes to the correct answer button since the first button which he depresses, if it is the wrong answer, results in the illumination of the "wrong" light 60. In order to more readily distinguish between the lights 30, 60 and 62 it may, of course, be desirable to provide the lights 60 and 62 as one color and to provide the light 30 as another color.

Still another slightly different variation of the basic embodiment of the invention is illustrated in FIG. 4 wherein the ready-right/wrong feature is illustrated.

In this embodiment a yellow light, for example, is illuminated when the instructor depresses the button on his side of the console which corresponds to the correct answer. If the student then selects an incorrect answer by depressing a button on his side of the console a red light, for example, is illuminated and the yellow light is extinguished. Conversely, if the student selects the correct answer a green light, for example, is illuminated and the yellow light is extinguished. Thus, in this embodiment only one of the yellow, red or green lights is illuminated at one time.

This embodiment includes the same basic switching means 24 and 26 together with the power source 28 and the correct answer indicating light 30. In addition, a "wrong" light 70 is coupled between the contacts 34'–35' and the contacts 44'–45'. A "ready" light 72 is also connected between the "wrong" light 70 and the correct answer indicating light 30.

In the operation of this embodiment of the invention the instructor again depresses the appropriate button on his side of the console which corresponds to the correct answer to the question. If, for example, the contacts 34 and 34' are so depressed current flows from the source 28 through primary terminal 32, contact 34', lights 70, 72 and 30 and back to the power source 28. Since the three lights 70, 72 and 30 are of different current ratings, for example "ready" light 72 sixty milliamps, "wrong" light 70 one hundred sixty milliamps, and correct answer indicator light 30 five hundred milliamps, the "ready" light 72 will be illuminated. This indicates to the student that the instructor has selected the correct answer and that the student may now proceed with his selection of an answer. The student then depresses the button on his side of the console which he believes to be the correct answer, but if the button pressed does not correspond to the correct answer on the overlay the "ready" light 72 will be extinguished and the "wrong" light 70 will be illuminated. This will occur because the "ready" light 72 is shunted by the two common contacts of the student switching means 26. For example, if the instructor has depressed contacts 34 and 34' and the student has depressed contacts 45 and 45' current will flow from the power source 28 through primary terminal 32, contact 34' "wrong" light 70, contact 45', primary terminal 49, correct answer indicator light 30 and back to the power source 28. Because the lights 70 and 30 are of different current ratings the "wrong" light 70 will be illuminated but the correct answer indicating light 30 will not be illuminated.

In the event that the student selects the correct answer and depresses buttons 44 and 44' current will flow from the power source 28 through primary terminal 32, contact 34, contact 44, primary terminal 42, correct answer indicator light 30 and back to the source 28. As a result, both the "wrong" and the "ready" lights are shunted and the correct answer indicator light 30 is placed directly across the power source 28 so that it is illuminated to indicate that a correct answer has been selected by the student.

The concept of this invention is readily applicable to more than one student and in this case the device of FIG. 1 may be used at a student location with one student using each side or panel of the device and with the instructor located at a different position with a master console as illustrated in FIG. 5 electrically connected to each of the student consoles.

The instructor's console, as illustrated in FIG. 5, includes a cabinet 80 and a plurality of push buttons 16 on the panel for receiving any one of a number of overlays by placing the overlays into grooves (not shown) in the sidewalls 81 since the overlays are longer than the exposed section of the panel. The master console 82 also includes a plurality of backlighted panels 84 which have spaces for the names of students and which include areas 89 which are used to record the number of incorrect or unanswered questions. The backlighted panels 84 are illuminated red, for example, when a respective student selects a wrong answer, and illuminated green, for example, when a respective student selects a right answer. The absence of a light indicates the student did not answer. In addition, the area 84 may be illuminated yellow, for example, when the instructor has depressed the button corresponding to the correct answer to the question.

The mode of operation of the multi-student embodiment is similar to that for the single student embodiment of the device and the circuitry of the multi-student embodiment is shown in detail in FIG. 6.

In this embodiment a plurality of student switching means 26, 26' etc. are illustrated as well as the instructor switching means 24. The "ready" light 72, the "wrong" light 70 and the correct answer indicating light 30 are located at the student console 26 as are the lights 30', 70', and 72' at student location 26', etc. In addition, "wrong" lights 86, 86', etc. and correct answer indicating lights 87, 87', etc. are located at the instructor's console behind the panels 84. If desired, a "ready" light may be placed in circuit between the "wrong" and "right" lights 86-87, 86'-87', etc. However, this additional feature merely indicates to the instructor when he has depressed his button and the operation of the multi-student embodiment will be described without the presence of the "ready" lights at the instructor's console.

Here again, the "ready," "wrong," and "right" lights are of different current ratings as set forth in the embodiment of FIG. 4. When the instructor depresses the button on his console corresponding to the correct answer to the question current flows from the source 28 through primary terminal 32, contact 34' (for example), through lights 86 and 70, "ready" light 72, through lights 30 and 87, and back to source 28. Because of the different current ratings of the lights the "ready" light 72, which may be yellow for example, is illuminated at each of the student consoles 26, 26', etc. to indicate to the students that the instructor has selected the correct answer and that they may proceed with their choices of what they believe to be the correct answer.

If the student selects an incorrect answer by depressing the contacts 47 and 47', for example, current will flow from the source 28 through primary terminal 32, contact 34' through "wrong" lights 70 and 86, contact 47', primary terminal 49 and through lights 30 and 87 back to the source 28. Thus, the "ready" light 72 is shunted by the student switching means 26 and because the current ratings of the "wrong" lights 70 and 86 are lower than the current ratings of the "right" lights 30 and 87 the "wrong" lights are illuminated to indicate that a wrong answer has been selected while the "right" lights remain dark.

In the event that the student selects the correct answer current flows from the source 28 through primary terminal 32, contact 34, contact 44, primary terminal 42 through "right" lights 30 and 87 and back to the source 28 so that the "wrong" lights 70 and 86 as well as the "ready" lights 72 are shunted and the "right" lights 30 and 87 are illuminated to indicate that a correct answer has been selected by the student.

Thus, the present invention provides for a teaching device which may be manufactured economically and which has wide application in the teaching field. The present invention provides for visual reward and the psychological encouragement of the learning process and also provides for the elimination of cheating by students.

Obviously many modifications and variations of the present invention are possible in light of the above teachings. It is therefore to be understood that within the scope of the appended claims the invention may be practiced otherwise than as specifically described.

What is claimed is:

1. A teaching device which utilizes the psychological factor of reward so as to make the learning process a pleasant and game-like experience, said device comprising:
   an electrical source;
   first instructor switching means for preselecting one of a plurality of possible answers as a correct solution,
   ready indicator means electrically connected to said first instructor switching means for indicating to a student when the preselection of the correct solution has been accomplished,
   second student switching means in circuit with said first switching means and said source for selecting one of a plurality of possible answers, and
   correct answer indicator means in circuit with said source and said first and second switching means for substantially immediately indicating when the answer selected on said second switching means corresponds to the preselected answer in said first switching means whereby a correct student answer is substantially immediately rewarded by actuation of said correct answer indicator means and whereby said correct answer indicator means remains inactivated if an incorrect student answer is selected.

2. A teaching device as in claim 1 wherein:
   each of said first and second switching means includes a primary terminal in circuit with said correct answer indicator means and said source; and a plurality of secondary contacts in selective circuit relationship with said primary terminal;
   said secondary contacts of said first switching means being coupled to respective ones of said secondary contacts of said second switching means;
   whereby an electrical circuit is completed through said first and second switching means and through said indicator means only when corresponding ones of said secondary contacts in said first and second switching means are placed in closed circuit relationship with the respective primary terminals of said first and second switching means.

3. A teaching device as in claim 2 wherein each of said secondary contacts of said first instructor switching means is associated with an answer to a question and wherein each of said corresponding secondary contacts of said second student switching means is associated with the answer to the same question.

4. A teaching device as in claim 2 wherein said ready indicator means indicates when the instructor has selected an answer to a question and when the instructor is ready for the student to select the answer believed to be the correct one, said device further including:
incorrect answer means operatively associated with said second student switching means and with said source for indicating when the student has selected an incorrect answer to the instructor's question.

5. A teaching device which utilizes the psychological factor of reward so as to make the learning process a pleasant and game-like experience, said device comprising:
an electrical source,
first instructor switching means including a first primary terminal and a plurality of first secondary contacts in selective circuit relationship with the first primary terminal,
second student switching means including a second primary terminal and a plurality of second secondary contacts in selective circuit relationship with the second primary terminal,
said first secondary contacts of said first switching means being coupled to respective ones of said second secondary contacts of said second switching means,
first ready indicator means operatively associated with said first instructor switching means, said correct answer indicator means and said source for indicating when the instructor has selected an answer to a question and when the instructor is ready for the student to select the answer believed to be the correct one,
said ready indicator means including:
a first plurality of contacts one each operable with each of said secondary contacts of said first switching means,
wherein each of said plurality of contacts is in selective operative circuit relationship with said first ready indicator means, said correct answer indicator means and said source for enabling the energization of said first ready indicator means when the instructor has selected the correct answer by operating said first switching means and electrically connecting the primary terminal thereof with one of the secondary contacts thereof and with a respective one of said first plurality of contacts of said ready indicator means associated with said first switching means,
correct answer indicator means in circuit with said source and said first and second switching means for indicating a predetermined actuation of said first and second switching means whereby a correct student answer is rewarded by actuation of said indicator means, an electrical circuit being completed through said first and second switching means and through said indicator means only when corresponding ones of said secondary contacts in said first and second switching means are placed in closed circuit relationship with the respective primary terminals of said first and second switching means, and
second incorrect answer indicator means operatively associated with said second student switching means and with said source for indicating when the student has selected an incorrect answer to the instructor's question.

6. A teaching device as in claim 4 wherein said second incorrect answer indicator means includes:
a second plurality of contacts one each operable with each of said secondary contacts of said second switching means;
a second indicator means in circuit with said correct answer indicator means and with said second plurality of contacts;
wherein each of said second plurality of contacts is in selective operative circuit relationship with said second indicator means, said correct answer indicator means and said source for enabling the energization of said second indicator means when the student has selected an incorrect answer by operating said second switching means and electrically connecting the primary terminal thereof with one of the secondary contacts thereof and with a respective one of the second plurality of contacts associated with said second switching means.

7. The teaching device of claim 6 wherein said correct answer indicator means, said first ready indicator means and said second indicator means are lights.

8. The teaching device of claim 7 wherein said first ready indicator light and said second indicator light will fully light on a fraction of the electrical current required to fully light the correct answer light wherein each of said first ready indicator and said second indicator lights will simultaneously fully light and said second correct answer light will not light when the teacher has operated said first switching means to select a correct answer and when the student has operated said second switching means to select an incorrect answer.

9. The teaching device of claim 7 wherein said first ready indicator light will fully light on a fraction of the electrical current required to fully light the second indicator light and the correct answer indicator light and wherein said second indicator light will fully light on a fraction of the electrical current required to fully light the correct answer indication light.

10. The teaching device of claim 9 wherein said first ready indicator light, said second indicator light and said correct answer indicator light are in series circuit with each other and in selective series circuit with said source and said first switching means.

11. The teaching device of claim 10 further including a plurality of said second student switching means each in identical circuit relationship with respect to said first instructor switching means;
each of said second student switching means having located therewith separate ones of said first ready indicator light, said second indicator light and said correct answer indicator light and in said selective series circuit with said source and said first instructor switching means.

12. The teaching device of claim 10 further including a plurality of said second student switching means each in similar circuit relationship with respect to said first instructor switching means;
respective additional correct answer indicating lights located at said first instructor switching means and corresponding to each of said plurality of second student switching means;
each of said additional correct answer indicating lights being in parallel circuit with respective ones of said correct answer indicating lights at respective ones of said second student switching means;
wherein each of said additional correct answer indicating lights indicates the selection of correct answers by the respective students.

13. The teaching device of claim 12 further including: respective additional second indicator lights located at said first instructor switching means and corresponding to each of said plurality of second student switching means;
each of said additional second indicator lights being in parallel circuit with respective ones of said second indicator lights at respective ones of said second student switching means;
wherein each of said additional second indicator lights indicates the selection of incorrect answers by the respective students.

References Cited
UNITED STATES PATENTS

| | | | |
|---|---|---|---|
| 2,498,578 | 2/1950 | Reinnagel | 35—35C |
| 2,970,386 | 2/1961 | Knutson | 35—9A |
| 3,070,904 | 1/1963 | Saba | 35—9R |
| 3,186,109 | 6/1965 | Brinton | 35—9R |

WILLIAM H. GRIEB, Primary Examiner